UNITED STATES PATENT OFFICE.

ALEXANDER SCHWARCMAN, OF BUFFALO, NEW YORK, ASSIGNOR TO SPENCER KELLOGG & SONS, INC., OF BUFFALO, NEW YORK, A CORPORATION OF NEW YORK.

FOOD PREPARATION AND PROCESS OF MAKING SAME.

1,342,827.      Specification of Letters Patent.      Patented June 8, 1920.

No Drawing.      Application filed April 4, 1919. Serial No. 287,422.

*To all whom it may concern:*

Be it known that I, ALEXANDER SCHWARCMAN, a citizen of the United States, residing at Buffalo, in the county of Erie and State of New York, have invented certain new and useful Improvements in Food Preparations and Processes of Making Same, of which the following is a specification.

This invention relates to food preparations and processes of making same; and it comprises an edible composition containing intermingled granules or particles of fatty matters of different degrees of hardness and individually emulsified in an emulsifying agent adapted to maintain the individuality of the intermingled individual particles; and it also comprises a method of making such a preparation wherein two or more different fatty matters of differing degrees of hardness are individually incorporated into a body of water, such body of water advantageously containing an emulsifying agent capable of maintaining the individualization of the particles of fatty matter so produced; all as more fully hereinafter set forth and as claimed.

All edible fats and oils are mixtures, in various proportions of different glycerids; a glycerid, chemically, being a compound of glycerin with a fatty acid, such as stearic acid, palmitic acid, oleic acid, etc. If liquid glycerids, such as olein predominate, the mixture is an oil; if solid glycerids, such as stearin or palmitin, predominate, it is a fat. These glycerids are mutually soluble or miscible but not to an unlimited extent. On chilling oils or cooling melted fats a temperature can be found at which there is a formation of granulations or crystals so that the mass can be separated into two fractions or phases, one being liquid at that temperature and the other being solid. Neither however is anything definite. The composition of the liquid phase and that of the solid phase depend wholly on the particular temperature and each varies as the temperature varies. The liquid may be regarded as a saturated solution of fat in oil ready to deposit more fat with further cooling; the solid as a composition or "solid solution" of as much oil in fat as the fat can retain without melting at that particular temperature. The liquid portion still contains solid glycerids in solution while the solid portion still contains liquid. At a sufficiently high temperature the whole composition melts into an oil and at all lower temperature is of a "hardness" dependent on the amount of solid matter separated.

For many purposes it is desirable to produce compositions which are, so to speak, intermediate in hardness between oils and solid fats; semi-solid compositions of the consistency of butter or lard. Artificial lards are often made by blending hard animal fats, like tallow, with natural oils, such as cottonseed oil; or by melting tallow and cooling in such a way as to crystallize out some but not all of the hard glycerids present leaving enough of the latter to give the consistency desired. In so melting, cooling and crystallizing the solid fraction, or "stearin" which is produced may be used to improve the consistency of liquid oils by blending therewith. By a chemical treatment known as hydrogenation, oils may be hardened—the olein present in the oil taking up hydrogen under the catalytic influence of nickel or palladium and becoming converted into stearin. If the hydrogenation is carried to completion, so that all the olein is converted into stearin, hard fats are produced from any natural oil, while if it be stopped before all the olein is so converted products are obtained of a hardness intermediate between a hard fat and the original oil. It is of course possible thus to obtain any degree of hardness desired, it being merely a matter of when the hydrogenation operation is stopped.

These semi-solid compositions obtained in any of the ways mentioned, that is by direct blending, by fractional crystallization or fractional hardening, are all, practically speaking, pasty compositions of liquid and solid glycerids; mixtures of liquid glycerids with somewhat more solid glycerid than they can dissolve at the ordinary temperature so that the excess remains as undissolved crystals mingled with the liquid. These crystals however themselves contain liquid glycerids; they are "solid" solutions. As the temperature rises, the excess tends to redissolve or melt and as it lowers the amount of solid is added to, and great variations in consistency or hardness take place with small changes in temperature.

I have found that in producing soft or semi-solid edible compositions I can secure better results in another way, producing a material in which the hard fats and soft fats are not in direct mixture or contact and exposed to the solvent effect of each other but exist as intermingled individual particles emulsified in a common emulsifying agent and preserving their identity. In an oil emulsion, as the term is ordinarily understood, globules of oil are suspended in, and isolated from each other by a body of aqueous fluid; and the word is here used in that sense albeit in making my emulsions I reduce the volume of the aqueous carrier to a small percentage of the total volume.

In so doing, with the oils and fats spaced apart from each other their relative amounts do not vary with temperature changes; that is, with a temperature drop the amount of solids is not increased at the expense of the solid glycerids dissolved in the oil while with an increase in temperature the solid fat does not tend to go into solution in the oil. If the oil is one which tends to remain liquid through a comparatively wide range of temperatures slight warming or cooling does not of course affect it and, similarly, if the fat is a hard one it also does not change. The conditions are quite different from those obtaining where the oil and fat are in mutual contact.

If a given oil, for example peanut oil, is introduced into a body of water under violent agitation, it is broken up into an emulsion or body of fine isolated globules, each spaced from and united to its neighbors by intervening water films. If now a stream of melted hard fat, such as natural or artificial stearin, be directed into the emulsifying apparatus it also is broken up into very fine disseminated globules which take their place alongside those of the original oil with liberation of some of the water. On cooling, the composition is now a mixture of two kinds of individual globules, in a common emulsifying agent, with one lot harder than the other lot and the consistency of the emulsion as a whole is harder than would be given by the oil alone. Such a compound emulsion does not show much variation in hardness with ordinary variations in temperature and is in this respect much superior to the ordinary blended or integral materials.

An emulsion of the character indicated containing an oil and a fat existing as separated globules side by side can be given almost any consistency within the range here desired. Whatever its hardness, however, the mass being after all a mass of small granules, cuts with a spoon or spreads with a knife in quite a different way from lard or other ordinary fatty matters of the same degree of hardness. The way it spreads or cuts changes very little with ordinary changes in temperature; the difference in this respect between this material and the ordinary blended lards, etc., being very striking. Further, for optical reasons, it has a peculiar fluffy look, having a creamy appearance quite different from that of lard or other integral bodies of fats. It has no "hard" look, having, so to speak, a jellied appearance. The material has no real melting or softening point in the sense that ordinary integral fatty masses, such as the blended lards, have a melting point.

On using for cooking purposes and heating, the mixture sputters in the pan, somewhat like butter. Used in frying it does not penetrate meat, etc., as does lard. For cooking purposes, it is much more desirable than integral bodies of fats, such as the semisolid compositions used as lard substitutes, for the reason that its finely divided character enables its easy mixture with the usual culinary mixtures. Being already wet and finely divided, the fatty particles blend readily with doughs. No violent or long continued stirring is necessary in making uniform mixtures with other food materials.

The two different oils or fats may be introduced into the emulsifying apparatus simultaneously but at different points, or they may be introduced successively.

In making compositions under the present invention any edible oils and fats, natural or artificial, may be employed. Peanut oil, cocoanut oil, cottonseed oil, lard oil, butter oil, sesame oil, oleo oil, etc., may be employed as the oily or soft constituent. As the hard constituent I may use any of the hard fats, natural or artificial, such as tallow, stearin recovered from oleo oil, stearin recovered from cottonseed oil, stearin made by hydrogenerating vegetable or animal oils, palmitin recovered from various oils by freezing processes, etc. The choice of each of the two materials depends upon various considerations such as flavor and odor, market prices, the hardness desired in the final products, etc.; and successful edible materials may be made from almost any oil of good quality in combination with almost any hard fat of edible nature.

In an advantageous embodiment of the present invention making a product intended for cooking purposes as an improvement on lard and the like, I warm peanut oil to 110° to 120° F. and incorporate with water at the same temperature. In incorporating, the mixture should be stirred or churned with considerable vigor reducing the oil to the finest possible globules. About 5 to 8 per cent. of water (on the final composition) is a good proportion for many purposes but other proportions may be used. This water may or may not contain a small amount of an emulsifying agent such as gelatin, Irish moss, Iceland moss, casein, etc. Water containing a few per cent. of a good grade of edible gelatin is desirable in preparations for some purposes. After the emulsification of the water and the oil is complete, I add a suitable hard fat in a molten state without discontinuing the churning. For example, a beef stearin of tolerably high melting point, or hardened peanut oil of, say, the melting point of 112° to 120° F. may be used. The hard fat is melted at the lowest possible temperature and added as a fine stream. About 15 to 30 per cent. (on the final composition) of this hard fat is the usual addition. As soon as incorporation and emulsification are complete, I begin to chill the mass but keep on churning during the chilling.

As stated, cottonseed oil, palm oil, etc., may be substituted for the peanut oil and various other hard fats for the beef stearin in the example given.

In making artificial butter, for which the ready spreading qualities of the present composition especially adapt it, the oil used should be a high-grade edible oil, such as refined cocoanut oil, cottonseed oil or peanut oil, and the fat a good grade of beef stearin or the like. Artificially hardened materials made from vegetable oils are particularly suitable as the fat component for the reason that the hydrogenation process removes all unpleasant odor and taste. In making artificial butter a little salt can be added before or after the composition is formed. Some butter may be worked in for the sake of the taste and odor. Coloring matter may be used but for the reasons stated, this is best used in solution in the emulsifying agent since color in the oil is not readily apparent in the composition.

Because of the presence of water, it is easy to impart the desired salt taste to the composition, the salt when added being taken up by the water between the several granules. In this respect the composition is like butter and unlike integral bodies of fat, such as the various blended semi-solid lard-like cooking materials now on the market. The present composition is very much like butter, save for the absence of milk, although it also differs in the fact that hard and liquid glycerids being separate, it is somewhat more indifferent to temperature changes: that is, it retains its consistency better under ordinary atmospheric changes than does butter.

The compound emulsified fat of the present invention is particularly useful as a lard substitute for cooking, baking and frying and also as a butter substitute. The lard compounds or similar products now on the market consist simply of various fats melted together or of half hydrogenated products. Such products naturally change in their properties with variation of temperatures. The product made in accordance with the present invention obtained through very thorough churning of the various ingredients is homogeneous in appearance. It retains its water constituents the same as ordinary butter does and it presents an entirely different appearance in fabric and texture to the lard compounds heretofore known. Like butter, it is highly digestible because of the finely divided form in which the fatty and oily matters are presented to the digestive organs.

What I claim is:—

1. An edible emulsion comprising particles of two or more fatty matters of different melting points individually distributed in a single body of an emulsifying agent.

2. An edible emulsion comprising particles of oil and of fat individually distributed in a single body of an emulsifying agent.

3. An edible emulsion comprising particles of a vegetable oil and of an artificial stearin individually distributed in a single body of an emulsifying agent.

4. The process of making edible compositions which comprises individually emulsifying an oil and a fat in the same body of emulsifying agent.

5. The process of making an edible composition which comprises individually churning a liquid and a solid fat with the same body of water.

6. The process of making edible compositions which comprises individually emulsifying two or more fatty matters in the same body of emulsifying agent.

In testimony whereof, I affix my signature hereto.

ALEXANDER SCHWARCMAN.